United States Patent

Kraus et al.

Patent Number: 5,176,463
Date of Patent: Jan. 5, 1993

[54] JOINT CONNECTION BETWEEN TWO PLASTIC PARTS

[75] Inventors: Willibald Kraus, Grundstadt; Hans-Werner Ruckwardt, Gollheim, both of Fed. Rep. of Germany

[73] Assignee: TRW United-Carr GmbH & Co., Fed. Rep. of Germany

[21] Appl. No.: 713,730

[22] Filed: Jun. 11, 1991

Related U.S. Application Data

[63] Continuation of Ser. No. 224,903, Jul. 27, 1988, abandoned.

Foreign Application Priority Data

Jul. 30, 1987 [DE] Fed. Rep. of Germany ....... 3725352

[51] Int. Cl.⁵ .............................................. F16B 11/00
[52] U.S. Cl. .................................... 403/265; 403/267; 403/291; 403/405.1; 16/227; 16/257; 24/274 R
[58] Field of Search ............ 403/2, 61, 59, 120, 403/119, 265, 267, 291, 405.1; 16/227, 257, 259, 222, 386; 248/74.1-74.5; 24/274 R

[56] References Cited

U.S. PATENT DOCUMENTS

| 2,605,926 | 8/1952 | Casey ........................ 403/119 |
| 3,594,852 | 7/1971 | Krawagna ...................... 16/227 |
| 3,914,832 | 10/1975 | Petrus ......................... 24/274 |
| 4,345,607 | 8/1982 | Contreras et al. ............. 16/227 X |
| 4,694,533 | 9/1987 | Doyen ......................... 16/257 |
| 4,726,731 | 2/1988 | Jones ........................ 403/61 X |
| 4,728,071 | 3/1988 | Salacuse .................... 248/74.5 X |
| 4,850,081 | 7/1989 | Grant ......................... 16/257 |
| 4,915,536 | 4/1990 | Bear et al. ................. 403/265 X |
| 4,916,968 | 4/1990 | Kabaya ....................... 16/257 |
| 4,956,898 | 9/1990 | Miyamura .................... 24/274 R |

FOREIGN PATENT DOCUMENTS 2127889 4/1984 United Kingdom ................. 403/2

Primary Examiner—Randolph A. Reese
Assistant Examiner—Heather Chun
Attorney, Agent, or Firm—Fay, Sharpe, Beall, Fagan, Minnich & McKee

[57] ABSTRACT

The invention relates to a joint connection (3) between two plastic parts (1 and 2), one part being at least partly rotatable in relation to the other part. According to the invention, the joint connection (3) consists of a shell-form outer element (4) on the one plastic part (1) and an inner element (5), at least partly supported in the outer element (4), on the other plastic part (2), both elements (4) and (5) being made by being injection molded one in the other, from one tool.

11 Claims, 2 Drawing Sheets

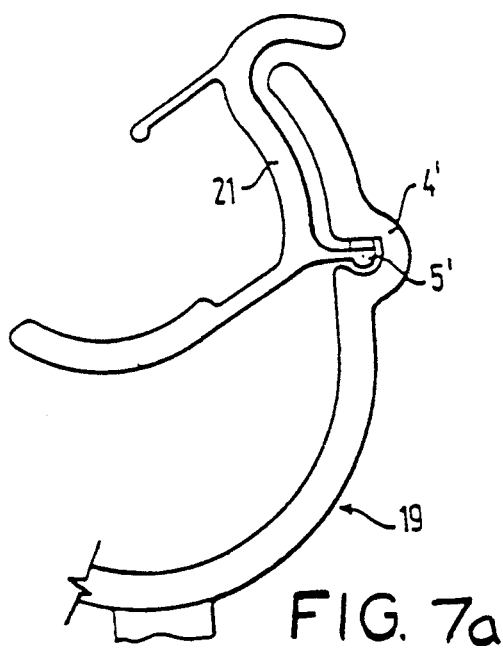
FIG. 7a
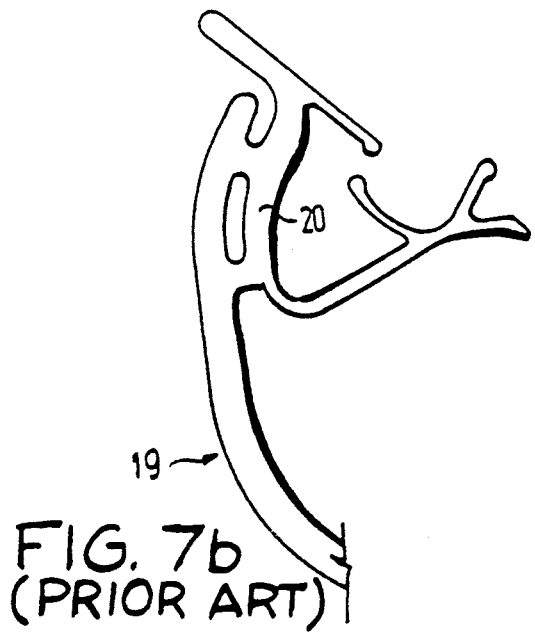
FIG. 7b
(PRIOR ART)
FIG. 8
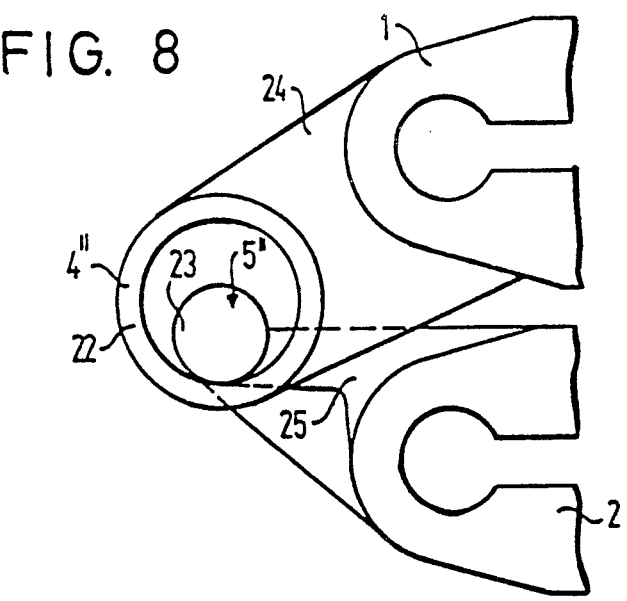
FIG. 9
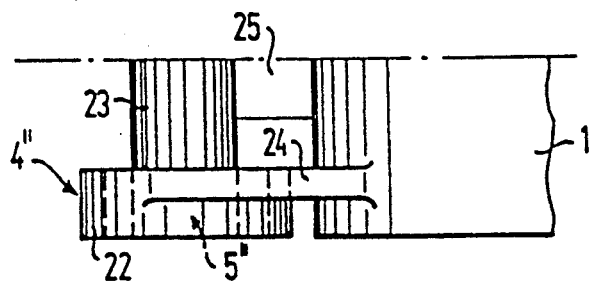

5,176,463

JOINT CONNECTION BETWEEN TWO PLASTIC PARTS

This application is a continuation of application Ser. No. 07/224,903 filed Jul. 27, 1988, now abandoned.

BACKGROUND OF THE INVENTION

The invention relates to a joint connection between two plastic parts, wherein one part is at least partly rotatable in relation to the other part.

As state of the art, such a construction is already known. For example, West German Printed Disclosure 3,014,578 shows a structure in which the two plastic parts, one of which is designed as a bearing part and the other as clamping jaw halves, are joined together through a joint connection in the form of a short one-piece short hinge strip. A disadvantage in this prior art construction, which uses a hinge strip as the joint connection, is the danger of breaking the hinge. In case of hard materials this danger is considerable when bending through the required bending range of about 90°. There is also the disadvantage of having a dependence on material of the film hinge. That is, the whole construction must be adapted to the shape of the hinge to achieve the desired elasticity.

In a so-called two-component injection molding process, there is a further disadvantage that a material must be used which is adapted to the shape of the hinge part.

As an alternative to this known state of the art, it is generally been known to produce two plastic parts singly and then assemble them together. In which case, however, high production and single parts costs result. For this type of construction, two dies are needed for the production of the corresponding parts, as well as different bearing holding devices. Additionally, the two parts must be assembled together in order to have a unit ready for use.

The present invention attacks the problem of designing a construction of the kind mentioned so that without regard to the material, an improvement of the hinging between two plastic parts can be provided with simpler and less expensive production.

This problem is solved, according to the invention, by the fact that the joint connection consists of a shell-form outer element on the one plastic part and an inner element, at least partly supported in the outer element, on the other plastic part. Further, the two elements are made by injection molding one inside the other, in a single die. In this way, the advantage is given of a simple and costsaving production, as a result of the use of a single die in the joint zone. The two plastic parts are, however, joined together movably through the joint zone. Since between the two plastic parts there is no connection in the form of a hinge, there is, advantageously, no longer any danger of breaking at the turning point. Moreover, for the joint connection according to the invention, there is no dependence on specific material characteristics or properties. The joint connection is ideally suited to hard materials. Furthermore, through the joint connection of the invention with the loose connection between the one and the other plastic part, a rotation range of up to 360° can be reached.

Since for the joint connection according to the invention, there is no dependence on material, the best materials can be used in each case, especially in a two-component injection molding process, which make possible a good adhesion between the first and the second components.

If the joint connection according to the invention is to absorb greater forces, this can be achieved at any time by increasing the thickness dimensions of the inner and outer elements.

The invention will be explained in detail below with reference to preferred embodiments illustrated in the drawings wherein:

FIG. 7 shows a frontal view of one form of the joint connection according to the invention used in a fastening element;

FIG. 8 shows in front elevational view another possible embodiment of the joint connection according to the invention; and, FIG. 9 shows a top view partly broken away of the joint connection according to FIG. 8.

Figure 1:
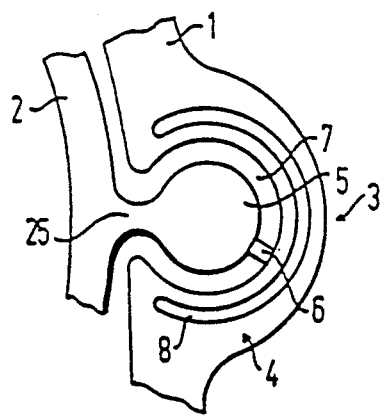
FIG. 1 shows a side view of a first embodiment of joint connection formed in accordance with the invention.
Figure 2:
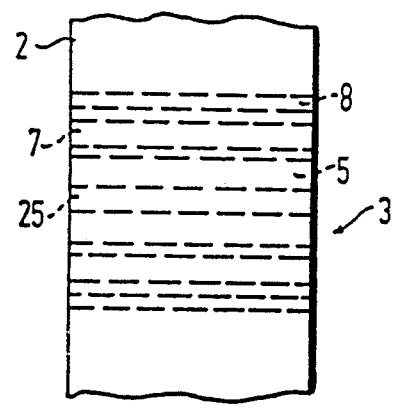
FIG. 2 shows the joint connection according to FIG. 1, in frontal view, partly broken away.

Referring more particularly to the drawings wherein the showings are for the purpose of illustrating preferred embodiments of the invention only, and not for the purpose of limiting same, FIG. 1 shows, in somewhat diagram form, a plastic part 1, which is connected through a joint connection 3 with a second plastic part 2. Here, the joint connection 3 is comprised of a shell-form, outer element 4 on the one plastic part 1. An inner element 5 is formed on the other plastic part 2. Inner element 5 is somewhat cylindrical and is at least partly supported in the outer element 4. Both elements 4 and 5 are made by being injected one inside the other from one tool.

As can be seen, the outer element 4 has an at least partly circular circumferential open zone disposed about the longitudinal axis of the cylindrical peg or inner element 5. In the open zone is supported the inner element 5. Preferably the element 5 is designed in a generally peg form and is spaced from outer element 4 over an interspace or gap 7. Between the two elements 4 and 5 is formed a breakable spacer piece 6. Piece 6 is designed to be broken with the action of the joint connection, so that then the peg-form inner element 5 can move, joint-like, in the shell-like outer element 4. For a better adapting of the rotational properties, there may be provided an opening 8 or circular slot in the outer element 4. The opening or slot 8 is preferably equidistant from the circular circumferential zone or interspace 7 in surrounding relationship thereto. The inner element 5, designed in peg form, is connected with the plastic part 2 through a stay or web 25. With this design, the swinging allowed by the joint connection according to the invention depends on the thickness of the stay 25 and the size of the opening of the outer element 4 in the zone about the stay 25.

Figure 3:
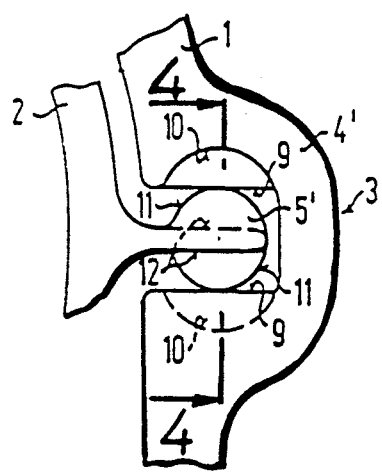
FIG. 3 is a side view of a second embodiment of the joint connection of the invention.
Figure 4:
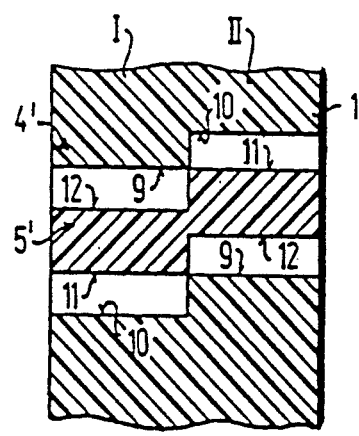
FIG. 4 shows a vertical section taken on line 4—4 through the joint connection according to FIG. 3.

In the embodiment according to FIGS. 3 and 4, the outer element 4' and the inner element 5' have, in each case, two zones I and II which are side-by-side but rotated by 180°. Here, the particular zone of the outer element 4' is bounded by a flat, or planar, end surface 9 and an arched, or curved, end surface 10.

From FIG. 4 it can be seen that in, zone I, the flat end surface 9 lies above the inner element 5', and in zone II, the flat end surface 9 lies below the element 5'. The arched surfaces 10 in zones I and II lie radially opposite the flat end surfaces 9 respectively.

The particular zone of the inner element 5' is here designed as a peg, with an arched, or curved, surface 11 and a flat, or planar, surface 12. As can be seen further from FIG. 4, in the zone I the flat surface 12 is above, and thus lies opposite the flat end surface 9 of the outer element 4'. The arrangement in zone II corresponds. In this way there is given a greater degree of freedom of the joint connection according to the invention, because of the interspaces between the surfaces 10 and 11 and the surfaces 9 and 12.

Figure 5:
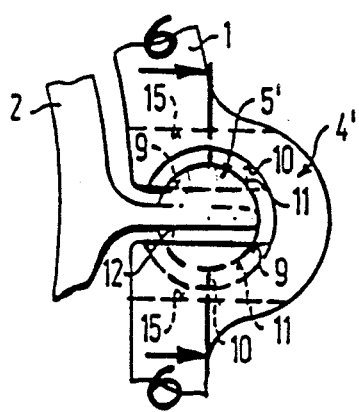
FIG. 5 shows in side view another embodiment of the joint connection according to the invention.
Figure 6:
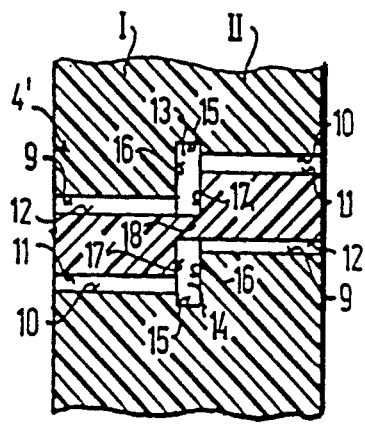
FIG. 6 shows a section taken on line 6—6 through the joint connection according to FIG. 5.

In the embodiment according to FIG. 5, the inner element and the outer element each have an opening 13, 14 respectively located in the middle between the two zones I and II. As seen in FIG. 6, the openings 13 and 14 are formed by a flat, or plane, surface 15, lying at a distance from the particular arched end surface 10, and by surfaces 16 and 17. Vertical plane surface 16 is arranged perpendicular to end surface 10, in the outer element. Vertical plane surface 17 is located, at a distance from the surface 16 of the outer element, and is perpendicular to a connection part 18 between the two zones of the inner part 5'. As can be seen, the opening 13 or 14 is bounded by the surfaces 15 and 16 in the middle zone of the outer element 4', and by the surface 17 and the intermediate part 18 of the inner element 5'.

The embodiment shown in FIGS. 5 and 6, is an extension or modification of the construction according to FIGS. 3 and 4, and provides a further degree of freedom for the joint connection according to the invention. Specifically, the plastic part 2 can also be moved in the axial direction of circumferential space 7 in relation to the plastic part 1. The distance of axial movement permitted corresponds, of course, to the width of the opening 13 or 14.

FIG. 7a illustrates the use of the joint connection as shown in FIGS. 3 and 4. Here a fastening element 19 is chosen as starting point. Element 19 has two shell-like elements 20 (as shown in FIG. 7b) and 21. Element 21 carries the inner element 5' in a manner similar to the plastic part 2 represented in FIGS. 1 to 6. The outer zone, that is, the outer element 4', is arranged in the bearing part of the fastening element 19, similar to the plastic part 1 in the embodiments according to FIGS. 1 to 6.

The outer element 4', as well as the inner element 5', is shaped similar to the construction shown in FIGS. 3 and 4; that is, with arched and flat surfaces. As can be seen, by this construction the shell element 21 can cover a great swinging range, and is thus more elastic in its mobility than the shell element 20 of FIG. 7b fastened to the corresponding bearing part through a prior art film hinge. However, there is also the possibility to arrange the shell element 20, similar to the joint connection of the shell element 21, on the corresponding bearing part.

In FIGS. 8 and 9 is shown another possible embodiment of joint connection according to the invention. As can be seen, in this embodiment the outer element 4" has a smooth, closed circumferential zone which is formed by a ring 22. The inner element 5" is designed in peg form and is supported in the ring 22 through the peg 23.

Here, in the drawing according to FIG. 8, there is a significant interspace between the peg 23 and the ring 22, but according to the shape of construction this space may be designed smaller. The outer element 4" is arranged in the plastic part 1 through a stay 24; the inner element 5" is fastened, in turn, through a stay 25 to the plastic part 2.

All the above-mentioned joint connections according to the invention are produced by being injected one in the other, in the joint zone, from a single tool, while the two plastic parts 1 and 2 are connected movable relation to each other, in the corresponding joint zone 3. As a result of this joint connection, there is no danger of breakage at the point of rotation. While for the shaping of the joint connection according to the invention, as a further advantage, there is no dependence on material.

What is claimed is:

1. A joint connection (3) comprising two plastic parts, the two plastic part (1, 2) being at least partially relatively rotatable, the joint connection having an outer element (4') which is formed on a first of the parts and an inner element (5') which is formed on a second of the parts and which is at least partially located within the outer element (4'), the outer element (4') defining a cylindrical circumferential space (7) disposed about an axis and the inner element (5') being located within the outer element centrally of the circumferential space (7), the joint connection having an axial middle between two zones (I, II) extending substantially along the axis, each zone extending radially through the two plastic parts (1, 2) and comprising a pair of radially opposed flat surfaces (9, 12) and a pair of radially opposed curved surfaces (10, 11) oriented in the axial direction, a cross-section of one zone resembling that of the other zone when rotated through 180° relative to the axis.

2. The joint connection according to claim 1, wherein the inner element (5') is substantially pin-shaped and further wherein respective flat surfaces (9) and respective curved surfaces (10) of the outer element correspond to an radially oppose respective flat and curved surfaces (12, 11) of the inner element.

3. The joint connection according to claim 2, wherein the surfaces of the inner element (11, 12) extend towards the axial middle.

4. The joint connection according to claim 3, wherein a connecting member (18) is arranged between axially adjacent surfaces (11, 12) of the inner element.

5. The joint connection according to claim 2, wherein a connecting member (18) is arranged between axially adjacent surfaces (11, 12) of the inner element.

6. The joint connection according to claim 5, wherein the outer element comprises radial openings (13, 14) in a region of close proximity to the connecting member (18).

7. The joint connection according to claim 1, wherein in each said zone the outer element has an inner surface configuration comprising a planar and a curved surface (9, 10) and the inner element has an outer surface configuration comprising a curved and a planar surface (11, 12).

8. The joint connection according to claim 7, wherein said zones extend to the axial middle.

9. The joint connection according to claim 8, wherein the inner and outer elements define a cavity (13, 14) between said zones.

10. The joint connection according to claim 7, wherein said zones extend to the axial middle, and the inner and outer elements define a cavity (13, 14) between said zones.

11. The joint connection according to claim 10, wherein said cavity is bounded by: (i) the outer element wherein respective opposed plan surfaces (15) are axially disposed between the curved surfaces (10) of the outer element in each said zone and the planar surfaces (9) thereof in the other said zone, and respective further surfaces (16) extend radially inwardly from said plane surfaces (15) to said planar surfaces (9); and (ii) the inner element wherein other surfaces (17) radially oppose said further surfaces (16) on the outer element, and surfaces of a web (18) interconnect parts of the inner element in the zones of the joint connection.

* * * * *